(12) United States Patent
Sato et al.

(10) Patent No.: US 8,288,496 B2
(45) Date of Patent: Oct. 16, 2012

(54) CONTACT LENS AND ITS MANUFACTURING METHOD

(75) Inventors: Toshihiro Sato, Aichi (JP); Akihiro Hiroki, Gunma (JP); Naotsugu Nagasawa, Gunma (JP); Masao Tamada, Gunma (JP)

(73) Assignees: Nippon Contact Lens Inc., Nagoya (JP); Japan Atomic Energy Agency, Naka-gun (JP)

( * ) Notice: Subject to any disclaimer, the term of this patent is extended or adjusted under 35 U.S.C. 154(b) by 0 days.

(21) Appl. No.: 13/046,887

(22) Filed: Mar. 14, 2011

(65) Prior Publication Data

US 2011/0237701 A1    Sep. 29, 2011

(30) Foreign Application Priority Data

Mar. 24, 2010   (JP) ................................ 2010-068944

(51) Int. Cl.
*C08G 18/06*   (2006.01)
(52) U.S. Cl. ........................... 527/301; 536/30; 523/106
(58) Field of Classification Search .................. 527/301; 536/30, 32
See application file for complete search history.

(56) References Cited

U.S. PATENT DOCUMENTS

| 3,782,950 | A | * | 1/1974 | Ranz et al. ................. 430/281.1 |
| 4,231,905 | A | * | 11/1980 | Neefe ............................ 523/106 |
| 4,565,857 | A | * | 1/1986 | Grant ............................ 527/301 |
| 4,786,446 | A | * | 11/1988 | Hammar et al. ............... 264/2.6 |
| 5,010,155 | A | * | 4/1991 | Mueller ......................... 527/301 |
| 5,474,065 | A | * | 12/1995 | Meathrel et al. ............. 600/376 |
| 5,486,579 | A | * | 1/1996 | Lai et al. ....................... 525/479 |
| 5,508,317 | A | * | 4/1996 | Muller ............................. 522/85 |
| 5,665,477 | A | * | 9/1997 | Meathrel et al. ............. 428/500 |
| 2003/0203991 | A1 | * | 10/2003 | Schottman et al. ........... 523/334 |
| 2008/0315444 | A1 | * | 12/2008 | Skipper ........................ 264/1.38 |
| 2009/0030108 | A1 | * | 1/2009 | Ito et al. ........................ 523/106 |

FOREIGN PATENT DOCUMENTS

JP    8-184786    7/1996

* cited by examiner

*Primary Examiner* — James J Seidleck
*Assistant Examiner* — Peter A Salamon
(74) *Attorney, Agent, or Firm* — Oblon, Spivak, McClelland, Maier & Neustadt, L.L.P.

(57) ABSTRACT

[Problems to be Solved]
To provide highly hydrous contact lenses having a cellulose derivative as an essential component.
[Means to Solve the Problems]
The highly hydrous contact lens formed by exposing a pasty mixture containing a cellulose derivative, a polymerizable compound couplable to the foregoing cellulose derivative, and water to radiation.

20 Claims, 1 Drawing Sheet

∿ : CELLULOSE DERIVATIVE (B)
M : COMPOUND (C) COUPLABLE TO CELLULOSE DERIVATIVE
⌇ : POLYMER OF M
● : CROSSLINKING POINTS

FIG. 1

∿ : CELLULOSE DERIVATIVE (B)
M : COMPOUND (C) COUPLABLE TO CELLULOSE DERIVATIVE
⁓ : POLYMER OF M
● : CROSSLINKING POINTS

FIG. 2

∿ : CELLULOSE DERIVATIVE (B)
M : COMPOUND (C) COUPLABLE TO CELLULOSE DERIVATIVE
⁓ : POLYMER OF M
● : CROSSLINKING POINTS

CONTACT LENS AND ITS MANUFACTURING METHOD

TECHNICAL FIELD

The present invention relates to contact lenses.

BACKGROUND ART

Cornea demands oxygen. Thus, oxygen has to be supplied to the cornea via the contact lens when the contact lens is placed on the cornea. Forms of supplying oxygen to the cornea vary dependent upon a kind of the contact lens. That is, a hydrous contact lens and non-hydrous contact lens differs from each other in the oxygen supplying form.

The foregoing non-hydrous contact lens, in general, is known as a hard contact lens. The hard contact lens is configured of, for example, silicone system resin or fluorine system resin. The reason is that the silicone resin and the fluoride resin have high oxygen permeability. The oxygen-permeable hard contact lens of this type is proposed, for example, in Japanese Patent Publication No. 63-36646 (1988) and Japanese Patent Publication No. 62-55122 (1987). However, the hard contact lens is poor in the wearing feeling. In particular, it causes severe pain when dust enters an eye.

The foregoing hydrous contact lens, in general, is known as a soft contact lens. The soft contact lens is soft as compared with the hard contact lens. Thus, the soft contact lens is excellent in the wearing feeling. The hydrous soft contact lens is remarkably prevailing from such a reason. With the case of the hydrous soft contact lens, oxygen dissolved into water is supplied to the cornea through the foregoing lens. Thus, with the case of the hydrous soft contact lens, it is preferable that a water content rate of the foregoing lens is high. That is, the high water content rate means that the oxygen supplying amount (oxygen permeating amount) is much. The water content rate higher than 70% causes the mechanical strength of the contact lens to decline. For examples, it results in being easily torn. Thus, it cannot be said safely that it is enough to increase the water content rate.

The silicone hydrogel contact lens incorporating the silicone in order to enhance the oxygen permeability is proposed (U.S. Pat. No. 5,486,579, and Japanese Unexamined Patent Application Publication (Translation of PCT Application) No. 1995-505169). However, the silicone compound and hydrophilic compound are poorly miscible with each other. For this, homogeneous polymerization is difficult. Thus, many leachable substances are detected. In addition, rubber elasticity peculiar to the silicone is yielded and flexibility is lost. For this, the maximum feature of the soft contact lens (the excellent wearing feeling) cannot be obtained. Further, the silicone is strongly hydrophobic. For this, water wettability of the lens surface is poor. The wearing feeling is not good from this viewpoint. Further, protein and fat easily adhere thereto. For this, the silicone hydrogel contact lens necessitates a surface treatment. However, durability of the surface treatment is not good.

On the other hand, nowadays, disposable contact lenses have prevailed from a viewpoint of handling of the contact lenses. That is, the disposable contact lenses on the premise that a replacement schedule is short (one day, one week, two weeks, or one month) have prevailed. An increase in the number of such disposable contact lenses incurs an anxiety over environmental destruction by the contact lenses made of plastics having oil resources as a material that are hardly decomposed. Thus, for example, the contact lenses are preferably manufactured from plant resources (plant-based polymer materials).

A development for new materials of the hydrous contact lens has been promoted from such a background. In particular, a development for the plant-based polymer materials that are highly hydrous, is excellent in the oxygen permeability, yet is rich in the mechanical strength, is excellent in the water wettability in addition hereto, is good in the wearing feeling, and is also high in the safety for human body has been promoted.

For example, the hydrous soft contact lens having cellulose as a raw material is proposed (JP-P1996-184786A).

CITATION LIST

[Patent Literature]
PTL 1: JP-P1996-184786A

SUMMARY OF INVENTION

Technical Problem

The Patent literature 1 discloses the hydrous soft contact lens that is configured of "polymer formed by crosslinking and polymerizing a vinyl monomer component containing a hydrophilic (meth)acrylamide" and "a cellulose derivative of which a ratio of the hydroxypropoxyl group in one molecule is 3 to 75% by weight". In the exemplary examples in its paragraphs [0066] to [0071], there is description of the effect that "the cellulose derivative (HPC), the hydrophilic (meth)acrylamide(N,N-dimethylacrylamide: DMAA), crosslink-able vinyl monomer (ethylene glycol dimethacrylate: EDMA) were fed into a flask. And, the mixing allowed HPC and DMAA to become miscible with each other. Thereafter, a polymerization initiator (benzoyl peroxide: BPO) was added. This mixed solution was subjected to the polymerization process at 130° C."

This inventor has additionally tested the Patent literature 1. As a result, the mechanical strength of the contact lens of the Patent Literature 1 was poor even though there is no description thereof in the Patent literature 1. In particular, a breaking elongation was very poor. There is description of the effect that the water content rate of the hydrous soft contact lens using the cellulose derivatives is 69.9 to 89.7% by weight in the Patent literature 1. However, the contact lens having a yet higher water content rate was required.

Thus, a first problem that is to be resolved by the present invention is resolved by providing the highly hydrous soft contact lens having the cellulose derivatives as an essential component.

A second problem that is to be resolved by the present invention is resolved by providing the highly hydrous soft contact lens excellent in the oxygen permeability.

A third problem that is to be resolved by the present invention is resolved by providing the highly hydrous soft contact lens excellent in the mechanical strength.

A fourth problem that is to be resolved by the present invention is resolved by providing the highly hydrous soft contact lens excellent in shape retainability.

A fifth problem that is to be resolved by the present invention is resolved by providing the highly hydrous soft contact lens excellent in transparency.

A sixth problem that is to be resolved by the present invention is resolved by providing the highly hydrous soft contact lens excellent in the water wettability (being excellently hydrophilic).

A seventh problem that is to be resolved by the present invention is resolved by providing the highly hydrous soft contact lens excellent in the wearing feeling.

Solution to Problem

An investigation for the problematic points of the materials of the foregoing Patent literature 1 has been earnestly promoted. As a result, it was thought that the reason why the mechanical strength was poor was that the material of the foregoing Patent literature 1 was only a blend of "the polymer formed by crosslinking and polymerizing a vinyl monomer component containing the hydrophilic (meth)acrylamide" and "the cellulose derivative of which a ratio of the hydroxypropoxyl group in one molecule is 3 to 75% by weight.

And, it was expected that the mechanical strength of the materials in which the cellulose derivative has crosslinked would be improved.

However, it was completely unclear whether the materials in which the cellulose derivative has crosslinked were hard or soft. Rather than saying that whether the materials were hard or soft were completely unclear, it was supposed that the foregoing material would lost its softness. It was supposed that, as a result, the wearing feeling of the contact lens made of the foregoing material declined. Further, it was not be able to be predicted completely whether the water content rate of the foregoing material became low, or else, whether it was at an identical level or so. In addition, the transparency as well of the foregoing material was not able to be predicted completely.

Without delay, a development for the material having a structure in which the cellulose derivative itself crosslinked was promoted. For example, HPC was exposed to the radiation under presence of water. The material having a structure in which the cellulose derivative crosslinked due to the radiation exposure was fragile and was poor in the mechanical strength, which differed from an expectation. That is, this material was not desirable as a material of the contact lenses.

Thereupon, a furthermore investigation has been promoted. As a result, this inventor has obtained a knowledge standpoint that incorporating the crosslink by the cellulose derivatives and the crosslink by the compounds other than cellulose derivatives into the crosslink of the cellulose derivatives allows an improvement in the mechanical strength to be realized.

The materials founded on this knowledge standpoint were produced by way of trial, and the properties such as the mechanical strength were investigated. As a result, it was recognized that they had the properties beyond expectation, and it was recognized that they were excellent as the contact lens material.

That is, the foregoing problems are solved by a manufacturing method of the contact lens that is characterized in including a step of exposing a pasty mixture containing the cellulose derivative, a polymerizable compound (however, the above compound differs from the foregoing cellulose derivative) couplable to the foregoing cellulose derivative, and water to the radiation.

That is, the foregoing problems are solved by a manufacturing method of the contact lens that is characterized in including a step of exposing a pasty mixture containing the cellulose derivative, the polymerizable compound (however, the above compound differs from the foregoing cellulose derivative) couplable to the foregoing cellulose derivative, and a saline solution to the radiation.

Further, the foregoing problems are solved by the foregoing manufacturing method of the contact lens that is characterized in including a filling step of filling a contact lens forming die with the foregoing pasty mixture, and a radiation exposure step of, after the foregoing filling step, exposing the foregoing pasty mixture to the radiation.

Further, the foregoing problems are solved by the foregoing manufacturing method of the contact lens that is characterized in that the foregoing radiation exposure allows a coupling reaction in which the foregoing compound couples to the foregoing cellulose derivative, and a polymerizing reaction in which the foregoing compound polymerizes, and a crosslinking reaction in which the foregoing cellulose derivative partners crosslink to each other to occur.

Further, the foregoing problems are solved by the foregoing manufacturing method of the contact lens that is characterized in that a ratio of 1 to 17.6 parts by mass of the foregoing compound per 100 parts by mass of the foregoing cellulose derivative is preferable.

Further, the foregoing problems are solved by the foregoing manufacturing method of the contact lens that is characterized in that preferably the foregoing cellulose derivative is one kind, or two kinds or more selected from a group of carboxyalkyl cellulose, hydroxyalkyl cellulose, and alkyl cellulose.

Further, the foregoing problems are solved by the foregoing manufacturing method of the contact lens that is characterized in that preferably the foregoing compound is a monomer having unsaturated bonds (for example, double bonds).

Further, the foregoing problems are solved by the foregoing manufacturing method of the contact lens that is characterized in that preferably the foregoing radiation is radiation selected from a group of γ-ray, X-ray and electron beam, and that preferably a dose thereof is 1 to 200 kGy.

The foregoing problems are solved by the contact lens that is obtained by the foregoing manufacturing method of the contact lens.

The foregoing problems are solved by a contact lens that is obtained by crosslinking the cellulose derivative, wherein the foregoing crosslink includes the crosslink via the cellulose derivative, and the crosslink via polymers of the polymerizable compound couplable to the foregoing cellulose derivative.

Further, the foregoing problems are solved by the foregoing contact lens that is characterized in that preferably a ratio is 1 to 17.6 parts by mass of the foregoing compound per 100 parts by mass of the foregoing cellulose derivative.

Further, the foregoing problems are solved by the foregoing contact lens that is characterized in that preferably the foregoing cellulose derivative is one kind, or two kinds or more selected from a group of carboxyalkyl cellulose, hydroxyalkyl cellulose, and alkyl cellulose.

Further, the foregoing problems are solved by the foregoing contact lens that is characterized in that preferably the foregoing compound is a monomer having unsaturated bonds (for example, double bonds).

Further, the foregoing problems are solved by the foregoing contact lens that is characterized in that a water content ratio is 85 to 95%, a breaking elongation is 150 to 270%, and a breaking strength is 2 to 15 $Kg/cm^2$.

Advantageous Effect of Invention

The contact lens of the present invention is the highly hydrous soft contact lens. It has a high gel fraction. It is highly hydrous. It is excellent in the oxygen permeability. It is excellent in the water wettability. It is excellent in the wearing feeling. There is no problem with the transparency as well. It is excellent in the shape retainability even though it is highly hydrous. It has the strength enough to cause no trouble in utilitarian use.

DESCRIPTION OF EMBODIMENTS

A first invention is a manufacturing method of the contact lens. In particular, it is a manufacturing method of the highly hydrous soft contact lens. This manufacturing method includes the radiation exposure step. This radiation exposure step is a step of exposing a pasty mixture (A) to the radiation. The foregoing pasty mixture (A) contains the cellulose derivative (B), and the polymerizable compound (C) couplable to the foregoing cellulose derivative. Preferably it contains water in addition hereto. The foregoing water is only water. Or, it is an aqueous solution containing electrolytes (for example, a saline solution). Or, the foregoing water is an aqueous solution containing water-soluble organic diluents. Preferably the foregoing cellulose derivative (B) is a plant-based polymer. The foregoing compound (C) differs from the foregoing cellulose derivative (B). Preferably the manufacturing method of the present invention includes the filling step of filling a contact lens forming die with the foregoing pasty mixture (A) prior to the foregoing radiation exposure step. And, the foregoing pasty mixture (A) is exposed to the radiation after the foregoing filling step. With a combination ratio of the foregoing cellulose derivative (B) and the foregoing compound (C), preferably a ratio of the latter is 1 to 17.6 parts by mass per 100 parts by mass of the former. More preferably a ratio of the latter is 2.5 to 17.5 parts by mass. Yet more preferably a ratio of the latter is 5 to 17 parts by mass. With a combination ratio of the water (aqueous solution), preferably a ratio is 50 to 1900 parts by mass of the water (aqueous solution) per 100 parts by mass of the foregoing cellulose derivative (B). More preferably a ratio is 65 to 1900 parts by mass. Yet more preferably a ratio is 200 to 1000 parts by mass. Preferably the foregoing cellulose derivative (B) is one kind, or two kinds or more selected from a group of carboxyalkyl cellulose, hydroxyalkyl cellulose, and alkyl cellulose. The foregoing compound (C) is a monomer having unsaturated bonds. For example, the foregoing compound (C) is a monomer having double bonds. In particular, it is a monomer having —C=C—. For example, it is a monomer having a $CH_2$=C group (For example, vinyl group). For example, it is esters of acrylic acid, methacrylic acid, itaconic acid, or carboxylic acid. The foregoing radiation is selected from a group of γ-ray, X-ray and electron beam. Preferably its dose is 1 to 200 kGy. The foregoing radiation exposure allows a coupling reaction in which the foregoing compound (C) couples to the foregoing cellulose derivative (B), and a polymerizing reaction in which the foregoing compound (C) polymerizes, and a crosslinking reaction in which the foregoing cellulose derivative (B) partners crosslink to each other to occur.

Figure 1:
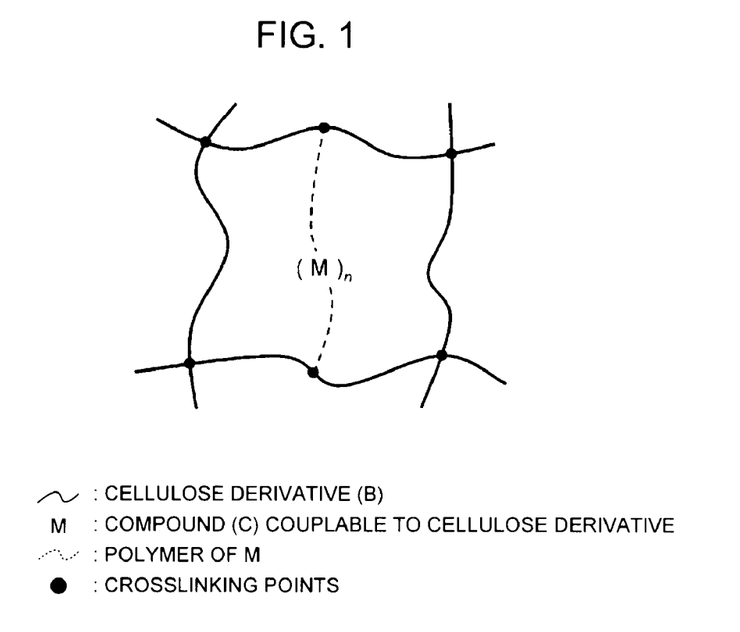
FIG. 1 is a schematic view of the crosslinking structure of a cellulose derivative (B) and a compound (C).
Figure 2:
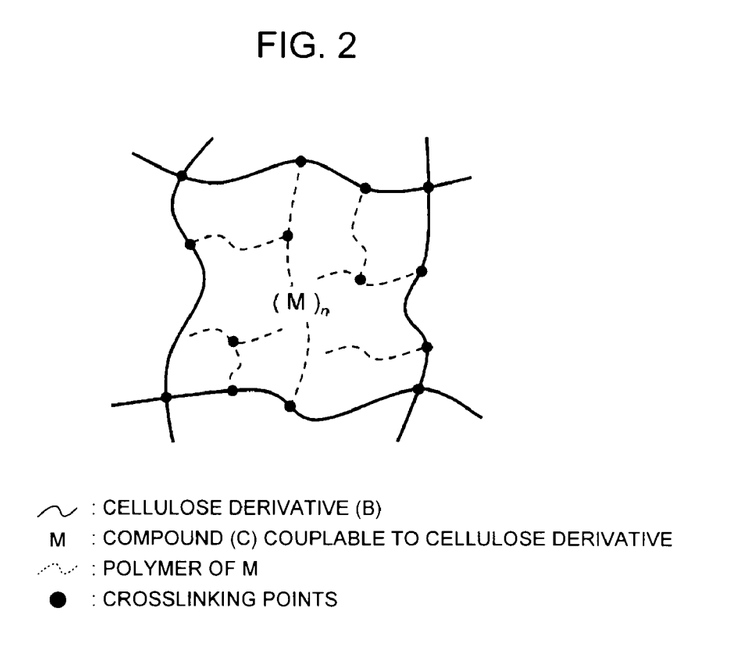
FIG. 2 is a schematic view of the crosslinking structure of a cellulose derivative (B) and a compound (C).

A second invention is a contact lens. In particular, it is highly hydrous soft contact lens. For example, it is a contact lens (highly hydrous soft contact lens) that is obtained by the foregoing manufacturing method. Or, it is a contact lens that is obtained by crosslinking the cellulose derivative (B). The foregoing crosslink includes the crosslink via the cellulose derivative (B), and the crosslink via polymers of the polymerizable compound (C) couplable to the foregoing cellulose derivative (B). An example of this crosslinking structure is shown in FIG. 1 and FIG. 2. Needless to say, the crosslinking structure is not limited to this form. With a combination ratio of the foregoing cellulose derivative (B) and the foregoing compound (C), preferably a ratio is 1 to 17.6 parts by mass of the latter per 100 parts by mass of the former. More preferably a ratio is 2.5 to 17.5 parts by mass of the latter. Yet more preferably a ratio is 5 to 17 parts by mass of the latter. Preferably the foregoing cellulose derivative (B) is a plant-based polymer. Preferably the foregoing cellulose derivative (B) is one kind, or two kinds or more selected from a group of carboxyalkyl cellulose, hydroxyalkyl cellulose, and alkyl cellulose. The foregoing compound (C) is a monomer having unsaturated bonds. For example, the foregoing compound (C) is a monomer having double bonds. In particular, it is a monomer having —C=C—. For example, it is a monomer having a $CH_2$=C group (for example, vinyl group). For example, it is esters of acrylic acid, methacrylic acid, itaconic acid, or carboxylic acid. Preferably the water content rate of the foregoing contact lens is 85 to 95%. Thus, it is excellent in the oxygen permeability. Preferably the breaking elongation of the foregoing contact lens is 150 to 270%. Preferably the mechanical strength of the foregoing contact lens is 2 to 15 $Kg/cm^2$. Thus, it is excellent in the mechanical strength. Further, it is good in the shape retainability. The foregoing contact lens has few leachable substances. Thus, it is high in the safety for human body. The foregoing contact lens is excellent in the water wettability (being excellently hydrophilic). Thus, it is good in the wearing feeling. The foregoing contact lens is excellent in the transparency.

Hereinafter, the present invention will be explained more detailedly.

In the manufacturing method of the highly hydrous soft contact lens according to the present invention, the ionizing radiation exposure allows the polymerizing reaction and the crosslinking reaction to occur. With this, the highly hydrous gel is obtained. That is, the highly hydrous gel can be obtained even though the polymerization initiator (radical polymerization initiator, thermal polymerization initiator of a peroxide system, or photopolymerization initiator) is not used. And, it has a high gel fraction, and has few leachable substances. Thus, it is also high in the safety for human body.

When the cellulose derivative (B) is exposed to the ionizing radiation, the crosslinking reaction occurs between molecular chains of the cellulose derivative (B) even without crosslinking additives. And, the gel is formed. Additionally, when the concentration of the cellulose derivative (B) is too low, the decomposing reaction is developed in such a manner that it holds a dominant position rather than the crosslinking reaction. Thus, the gel is hardly obtained. To the contrary, when the concentration of the cellulose derivative (B) is too high, the cellulose derivative (B) hardly disperses in a uniform manner, and the crosslinking reaction hardly occurs. The preferable concentration is, for example, 5 to 60%. The more preferable concentration is 10 to 30%. The yet more preferable concentration is 15 to 25%. The extent of the crosslink is almost governed by an amount of the raw material (the amounts of the cellulose derivative (B) and the polymerizable compound (C)), and the radiation dose. When the radiation dose is increased, a degree of the crosslink is increased. When the radiation dose is increased, the water content rate declines.

The gel obtained by exposing a sample comprised of only the cellulose derivative (B) to the ionizing radiation was insufficient in the mechanical strength. The compound (C) was also used in order to improve this. This compound (C) is a compound (monomer) that reacts with and couples to the cellulose derivative (B), and yet polymerizes. The gel obtained by exposing a mixture of this compound (C) and the cellulose derivative (B) to the ionizing radiation was high in the water content rate, and excellent in the mechanical strength. The preferable combination ratio is one already described above.

The present invention uses the cellulose derivative (B). Preferably the cellulose derivative (B) is a plant-based cellulose derivative. The foregoing cellulose derivative (B) is a self-crosslinkable cellulose derivative. The foregoing cellulose derivative (B) is a cellulose derivative that crosslinks by the ionizing radiation exposure. As such a cellulose derivative (B), the alkyl cellulose (for example, methyl cellulose and ethyl cellulose) can be listed. Or, hydroxyalkyl cellulose (for example, hydroxyethyl cellulose, hydroxypropyl cellulose, and hydroxypropylmethyl cellulose) can be listed. Or, carboxyalkyl cellulose (for example, carboxymethylated cellulose derivative or carboxyethylated cellulose derivative) can be listed. Preferably the foregoing cellulose derivative (B) is nonionic. Preferably the foregoing cellulose derivative (B) is water-soluble. The most preferable cellulose derivative (B) is hydroxypropyl cellulose.

The compound (C) is a compound that can polymerization-react, and yet can couple to the foregoing cellulose derivative (B) so as to crosslink. The compound (C) is a monomer having unsaturated bonds. For example, it is a monomer having double bonds. In particular, it is a monomer having —C=C—. For example, it is a monomer having a $CH_2$=C group (For example, vinyl group). For example, it is esters of acrylic acid, methacrylic acid, itaconic acid, or carboxylic acid. The following compounds can be listed. Esters of alcohol (for example, monohydric alcohol (or polyhydric alcohol) having a carbon number of 1 to 11), and carboxylic acid (for example, acrylic acid, methacrylic acid, or itaconic acid) can be listed. Esters of fluoroalkyl alcohol having a linear (or branched) chain with 1 to 20 fluorine atoms and carboxylic acid (for example, acrylic acid, methacrylic acid, or itaconic acid) can be also listed. Esters of fluoroalkylbenzyl alcohol and carboxylic acid (for example, acrylic acid, methacrylic acid, or itaconic acid) can be also listed. Silicone-containing monomers and N-vinyl heterocyclic monomers can be also listed. Crosslinkable multifunctional monomers, being crosslinking additives, can be also listed. Besides, the compounds similar to the foregoing compounds are used. Preferably the foregoing compound (c) is a compound having a hydrophobic group.

As esters ((meth)acrylic acid esters) of monohydric alcohol (or polyhydric alcohol) having a carbon number of 1 to 11 and acrylic acid (methacrylic acid), the following compounds can be listed. They are, for example, methyl(meth)acrylate, ethyl(meth)acrylate, n-propyl (meth)acrylate, iso-propyl (meth)acrylate, n-butyl(meth)acrylate, iso-butyl(meth)acrylate, tert-butyl (meth)acrylate, pentyl(meth)acrylate, neopentyl(meth)acrylate, hexyl(meth)acrylate, cyclohexyl(meth) acrylate, 2-ethylhexyl(meth)acrylate, 2-hydroxyethyl(meth) acrylate, 2-hydroxypropyl (meth)acrylate, 3-hydroxypropyl (meth)acrylate, 2,3-dihydroxypropyl (meth)acrylate, 2-hydroxybutyl(meth)acrylate, 4-hydroxybutyl(meth)acrylate, 2-hydroxy-1-phenylethyl (meth)acrylate, diethylene gylcol mono(meth)acrylate, triethylene glycol mono(meth) acrylate, 2-methoxyethyl(meth)acrylate, 2-ethoxyethyl (meth)acrylate, 2-butoxyethyl (meth)acrylate, 3-methoxypropyl(meth)acrylate, 3-ethoxypropyl(meth)acrylate, 2-methoxypropyl (meth)acrylate, 2-ethoxypropyl(meth) acrylate, diethylene glycol monomethylether mono(meth) acrylate, diethylene glycol monoethylether (meth)acrylate, triethylene glycol monomethylether (meth)acrylate, triethylene glycol monoethylether (meth)acrylate, triethylene glycol monopropylether (meth)acrylate, tetraethylene glycol monomethylether (meth)acrylate, tetraethylene glycol monoethylether (meth)acrylate, tetraethylene glycol monopropylether (meth)acrylate, tetraethylene glycol monobutylether (meth)acrylate, pentaethylene glycol monomethylether (meth)acrylate, pentaethylene glycol monoethylether (meth)acrylate, pentaethylene glycol monopropylether (meth)acrylate, pentaethylene glycol monobutylether (meth)acrylate, phenoxyethyl(meth)acrylate, and 2-hydroxy-3-phenoxypropyl(meth)acrylate.

As esters (itaconic acid monoesters and itaconic acid diesteres) of monohydric alcohol (or polyhydric alcohol) having a carbon number of 1 to 11 and itaconic acid, the following compounds can be listed. They are, for example, itaconic acid dimethyl, itaconic acid monomethyl, itaconic acid diethyl, itaconic acid monoethyl, itaconic acid di-n-propyl, itaconic acid mono-n-propyl, itaconic acid diisopropyl, itaconic acid monoisopropyl, itaconic acid di-n-butyl, itaconic acid mono-n-butyl, itaconic acid dipentyl, itaconic acid monopentyl, itaconic acid dineopentyl, itaconic acid mononeopentyl, itaconic acid di-n-hexyl, itaconic acid mono-n-hexyl, itaconic acid dicyclohexyl, itaconic acid monocyclohexyl, itaconic acid di-2-ethylhexyl, itaconic acid mono-2-ethylhexyl, itaconic acid di-2-hydroxyethyl, itaconic acid mono-2-hydroxyethyl, itaconic acid di-2-hydroxypropyl, itaconic acid mono-2-hydroxypropyl, itaconic acid di-3-hydroxypropyl, itaconic acid mono-3-hydroxypropyl, itaconic acid di-2-hydroxybutyl, itaconic acid mono-2-hydroxybutyl, itaconic acid di-4-hydroxybutyl, and itaconic acid mono-4-hydroxybutyl.

As the compounds similar to the foregoing esters, the following compounds can be listed. They are, for example, phenyl(meth)acrylate, benzyl(meth)acrylate, glycidyl(meth) acrylate, tetrahydrofurfuryl(meth)acrylate, 2-(meth) acryloxyethyl acid phosphate, polyethylene glycol mono (meth)acrylate, itaconic acid diphenyl, itaconic acid monophenyl, itaconic acid dimethylphenyl, itaconic acid mono-methylphenyl, styrene, α-methyl styrene, t-butyl styrene, (meth)acrylamide, N-methylol (meth)acrylamide, N-alkyl(meth)acrylamides, N,N-dialkyl (meth)acrylamides, N-(1,1-dimethyl-3-oxobutyl)acrylamide, morpholino (meth) acrylate, morpholinoethyl(meth)acrylate, aminoalkyl(meth) acrylates, N-alkylaminoalkyl(meth)acrylate, N,N-dialkylaminoalkyl(meth)acrylate, N-vinyl acetamide, N-vinyl-N-methyl acetamide, N-vinyl-N-ethyl acetamide, N-(2-hydroxyethyl)-N-vinyl acetamide, N-vinyl formamide, N-vinyl-N-methyl formamide, N-vinyl-N-ethyl formamide, N-(2-hydroxyethyl)-N-vinyl formamide, acrylic acid, methacrylic acid, itaconic acid, crotonic acid, fumaric acid, fumaric acid esters, and maleic acid esters.

As esters of the foregoing fluoroalkyl alcohol having a linear (or branched) chain with 1 to 20 fluorine atoms or the foregoing fluoroalkylbenzyl alcohol, and carboxylic acid (for example, acrylic acid, methacrylic acid, or itaconic acid), the following compounds can be listed. For example, (meth) acrylic acid fluoroesters can be listed. Itaconic acid difluoroesters can be listed. Itaconic acid monofluoroesters can be listed. (Meth)acrylic acid fluoroesters are, for example, 2,2, 2-trifluoroethyl(meth)acrylate, 2,2,3,3-tetrafluoropropyl (meth)acrylate, 2,2,3,3,3-pentafluoropropyl (meth)acrylate, 2,2,2-trifluoro-1-trifluoromethyl ethyl(meth)acrylate, 2,2,3, 4,4,4-hexafluorobutyl(meth)acrylate, 2,2,3,3,4,4,5,5-octafluoropentyl(meth)acrylate, 3,3,4,4,5,6,6,6-octafluoro-5-trifluoro methylhexyl(meth)acrylate, 1H,1H-pentadecafluorooctyl (meth)acrylate, 1H,1H,2H,2H- heptadecafluorodecyl(meth)acrylate, 3-perfluorobutyl-2-hydroxypropyl (meth)acrylate, 3-(perfluoro-3-methylbutyl)-2-hydroxypropyl(meth)acrylate, 3-(perfluoro-5-methylhexyl)-2-hydroxypropyl(meth)acrylate, o-trifluoromethyl benzyl (meth)acrylate, and p-trifluoromethyl benzyl(meth)acrylate. As itaconic acid difluoroesters and itaconic acid monofluoroesters, for example, bis-2,2,2-trifluoroethyl itaconate, 2,2,2-trifluoroethyl itaconate, bis-2,2,3,3-tetrafluoropropyl itaconate, 2,2,3,3-tetrafluoropropyl itaconate, bis-2,2,3,3,4,4,5,5-octafluoropentyl itaconate, 2,2,3,3,4,4,5,5-octafluoropentyl itaconate, bis-1H,1H,-pentafluoropropyl itaconate, 1H,1H,-pentafluoropropyl itaconate, bishexafluoroisopropyl itaconate, hexafluoroisopropyl itaconate, bis-1H,1H-heptafluorobutyl itaconate, 1H,1H-heptafluorobutyl itaconate, bis-perfluoro-t-butyl itaconate, perfluoro-t-butyl itaconate, bis-1H,1H-pentadecafluorooctyl itaconate, 1H,1H-pentadecafluorooctyl itaconate, bis-1H,1H,2H,2H-heptadecafluorodecyl itaconate, 1H,1H,2H,2H-heptadecafluorodecyl itaconate, bis-o-trifluoromethyl benzyl itaconate, o-trifluoromethyl benzyl itaconate, bis-p-trifluoromethyl benzyl itaconate, and p-trifluoromethyl benzyl itaconate can be listed.

As silicone-containing monomers, the following compounds can be listed. For example, organosiloxanes can be listed. Organosiloxanes are silicone-containing (meth)acrylate, silicone-containing multifunctional (meth)acrylate, silicone-containing (meth)acrylamide, silicone-containing itaconate, and silicone-containing styrene.

Silicone-containing (meth)acrylates are, for example, (meth)acryloxy ethoxy propyl pentamethyl disiloxane, (meth)acryloxy ethoxy propyl heptamethyl trisiloxane, (meth)acryloxy ethoxy propyl tris(trimethyl siloxy)silane, (meth)acryloxy ethoxy propyl phenyl tetramethyl disiloxane, (meth)acryloxy ethoxy propyl n-pentylhexamethyl trisiloxane, (meth)acryloxy ethoxy propyl phenyl octamethyl tetrasiloxane, (meth)acryloxy ethoxy propyl isobutyl tetramethyl disiloxane, (meth)acryloxy ethoxy propyl methyl bis(trimethyl siloxy)silane, (meth)acryloxy ethoxy propyl tris(dimethyl cyclohexyl siloxy)silane, (meth)acryloxy ethoxy propyl pentamethyl disiloxy bis(trimethyl siloxy)silane, (meth)acryloxy ethoxy propyl heptametyhl cyclotetrasiloxane, (meth) acryloxy ethoxy propyl-tris(acetoxyethyl dimethyl siloxy)silane, (meth)acryloxy ethoxy propyl-tris(carboxyethyl dimethyl siloxy)silane, 1-(meth)acryloxy ethoxy propyl-3-(hydroxy ethoxy propyl)-1,1,3,3-(tetramethyl)disiloxane, 1-(meth)acryloxy ethoxy propyl-3-[(hydroxyethyl carbonyl)propyl]-1,1,3,3-(tetramethyl)disiloxane, 1-(meth)acryloxy ethoxy propyl-5-[(dihydroxy propyloxy)propyl]-1,1,3,3,5,5-(hexamethyl)trisiloxane, (meth)acryloxy propyl-1,1,3,3,3-pentamethyl disiloxane, (meth)acryloxy propyl-1,1,3,3,5,5,5-heptamethyl trisiloxane, (meth)acryloxy propyl-tris(trimethyl siloxy)silane, (meth)acryloxy propyl-3-phenyl-1,1,3,3-tetramethyl disiloxane, (meth)acryloxy propyl-1,1-diethyl-3,3,3-tribenzyl disiloxane, (meth)acryloxy propyl-1,1,3,3,5,5-hexamethyl-3-pentyl trisiloxane, (meth)acryloxy propyl-1,1,3,3,5,5,7,7-octamethyl-7-phenyltetrasiloxane, (meth)acryloxy propyl-3-isobutyl-1,1,3,3-tetramethyl disiloxane, (meth)acryloxy propyl methyl bis(trimethyl siloxy)silane, (meth)acryloxy propyl tris(dimethyl cyclohexyl siloxy)silane, (meth)acryloxy propyl(pentamethyl disiloxy)bis(trimethyl siloxy)silane, (meth)acryloxy propyl heptamethyl cyclotetrasiloxane, (meth)acryloxy propyl-1,3,5,7-tetramethyl-3,5,7-tripropyl cyclotetrasiloxane, methyl bis(trimethyl siloxy)silylpropylglycerol (meth)acrylate, tris(trimethyl siloxy)silylpropylglycerol (meth)acrylate, and mono [methylbis(trimethyl siloxy)siloxy]bis(trimethyl siloxy) silylpropylglycerol (meth)acrylate.

Silicone-containing multifunctional (meth)acrylates are, for example, 1,3-bis[(meth)acryloxy ethoxy propyl]-1,1,3,3-(tetramethyl)disiloxane, 1,5-bis[(meth)acryloxy ethoxy propyl]-1,1,3,3,5,5-(hexamethyl)trisiloxane, 1,7-bis[(meth)acryloxy ethoxy propyl]-1,1,7,7-tetrakis(trimethyl siloxy)-3,3,5,5-(tetramethyl-tetrasiloxane, 1,3-bis[(meth)acryloxy ethoxy propyl]-1,1,3,3-tetrakis[bis(trimethyl siloxy)methylsiloxy]disiloxane, 1,3-bis[(meth)acryloxy propyl]-1,1,3,3-tetraphenyl)disiloxane, 1,3-bis[(meth)acryloxy propyl]-1,1,3,3-(tetramethyl)disiloxane, 1,5-bis[(meth)acryloxy propyl]-1,1,3,3,5,5-(hexamethyl)trisiloxane, 1,7-bis[(meth)acryloxy propyl]-1,1,7,7-tetrakis(trimethyl siloxy)-3,3,5,5-(tetramethyl)-tetrasiloxane, 1,3-bis[(meth)acryloxy propyl]-1,1,3,3-tetrakis[bis(trimethyl siloxy)methylsiloxy]disiloxane, 1,3-bis[(meth)acryloxy propyl]-1,1,3,3-(tetraphenyl)disiloxane, 1,5-bis[(meth)acryloxy ethoxy propyl]-1,3,5-(trimethyl)-1,3,5-(tripropyl)trisiloxane, 1,5-bis[(meth)acryloxy ethoxy propyl]-1,3,5,7-(tetramethyl)-3,7-(dipropyl)cyclotetrasiloxane, 1,5-bis[(meth)acryloxy ethoxy propyl]-1,1,3,3,5,5-(hexamethyl)trisiloxane, 1,3-bis[(meth)acryloxy ethoxy propyl]-1,1,3,3-tetrakis(acetoxy ethyl dimethylsiloxy)disilane, 1,5-bis[(meth)acryloxy propyl]-1,3,5-(trimethyl)-1,3,5-(tripropyl)trisiloxane, 1,5-bis[(meth)acryloxy propyl]-1,3,5,7-(tetramethyl)-3,7-(dipropyl)cyclotetrasiloxane, 1,5-bis[(meth)acryloxy propyl]-1,1,3,3,5,5-(hexamethyl)trisiloxane, 1,3-bis[(meth)acryloxy propyl]-1,1,3,3-tetrakis(acetoxy ethyl dimethyl siloxy)disilane, 1,3,5-tris[(meth)acryloxy ethoxy propyl]-1,3,5,7-(tetramethyl)-7-(propyl)cyclotetrasiloxane, 1,3,5-tris[(meth)acryloxy propyl]-1,3,5,7-(tetramethyl)-7-(propyl)cyclotetrasiloxane, 1,3,5,7-tetrakis[(meth)acryloxy ethoxy propyl]-1,3,5,7-(tetramethyl)cyclotetrasiloxane, and 1,3,5,7-tetrakis[(meth)acryloxy propyl]-1,3,5,7-(tetramethyl)cyclotetrasiloxane.

Silicone-containing (meth)acrylamides are, for example, 3-[tris(trimethyl siloxy)silyl]propyl(meth)acrylamide, 3-[bis(trimethyl siloxy)methylsilyl]propyl(meth)acrylamide, [tris(trimethyl siloxy)silyl]methyl(meth)acrylamide, and [bis(trimethyl siloxy)methylsilyl]methyl(meth)acrylamide.

Silicone-containing itaconates are, for example, tris(trimethyl siloxy)silylpropyl itaconate, bis[tris(trimethyl siloxy)silylpropyl]itaconate, methyl di(trimethyl siloxy)silylpropyl itaconate, bis[methyl di(trimethyl siloxy)silylpropyl]itaconate, tris(trimethyl siloxy)silylpropylglycerol itaconate, bis[tris(trimethyl siloxy)silylpropylglycerol]itaconate, methyl di(trimethyl siloxy)silylpropylglycerol itaconate, and bis[methyl di(trimethyl siloxy)silylpropylglycerol]itaconate.

Besides them, for example, methyl=3-(3-(3,3,3-trimethyl-1,1-bis((trimethylsilyl)oxy)disiloxanyl)propyl)oxycarbonyl-3-butanate, isopropyl=3-(3-(3,3,3-trimethyl-1,1-diphenyl disiloxanyl)propyl)oxycarbonyl-3-butanate, 3-(3,3,3-trimethyl-1,1-bis((trimethylsilyl)oxy)disiloxanyl)propyl=3-phenethyl oxycarbonyl-3-butanate, 3-(3,3,3-trimethyl-1,1-bis((trimethylsilyl)oxy)disiloxanyl)propyl=3-methoxycarbonyl-3-butanate, 3-(3,3,3-trimethyl-1,1-bis((trimethylsilyl)oxy)disiloxanyl)propyl=3-(3-(3,3,3-trimethyl-1,1-bis((trimethylsilyl)oxy)disiloxanyl)propyl)oxycarbonyl-3-butanate, 3-(1,3,3,3-tetramethyl-1-((trimethylsilyl)oxy)disiloxanyl)propyl=3-(3-(1,3,3,3-tetramethyl-1-((trimethylsilyl)oxy)disiloxanyl)propyl)oxycarbonyl-3-butanate, and 3-(1,1,3,3-tetramethyl-3-phenyl disiloxanyl)propyl=3-(3-(1,1,3,3-tetramethyl-3-phenyl disiloxanyl)propyl)oxycarbonyl-3-butanate are also used.

Silicone-containing styrenes are, for example, tris(trimethyl siloxy)silylethyl styrene, bis(trimethyl siloxy)methyl silylethyl styrene, tris(trimethyl siloxy)siloxy dimethyl silylethyl styrene, [bis(trimethyl siloxy)methyl siloxy]dimethyl silylethyl styrene, heptamethyl trisiloxanyl ethyl styrene, nonamethyl tetrasiloxanyl ethyl styrene, heptacosamethyl tridecasiloxanyl ethyl styrene, hentriacontamethyl pentadecasiloxanyl ethyl styrene, tris(pentamethyl disiloxy)silylethyl styrene, (tristrimethyl siloxy)siloxy bis(trimethyl siloxy)silylethyl styrene, bis(heptamethyl trisiloxy)methyl silylethyl styrene, tris[methyl bis(trimethyl siloxy)siloxy]silylethyl styrene, trimethyl siloxy bis[tris(trimethyl siloxy)siloxy]silylethyl styrene, heptakis(trimethyl siloxy)trisiloxanyl ethyl styrene, tris[tris(trimethyl siloxy)siloxy]silylethyl styrene, nonakis(trimethyl siloxy)tetrasiloxanyl ethyl styrene, bis(tridecamethyl hexasiloxy)methyl silylethyl styrene, heptamethyl cyclotetrasiloxanyl ethyl styrene, heptamethyl cyclotetrasiloxy bis(trimethyl siloxy)silylethyl styrene, tripropyl tetramethyl cyclotetrasiloxanyl ethyl styrene, tris(trimethyl siloxy)silyl styrene, bis(trimethyl siloxy)methylsilyl styrene, tris(trimethyl siloxy)siloxanyl dimethylsilyl styrene, [bis(trimethyl siloxy)methyl siloxanyl]dimethylsilyl styrene, pentamethyl disiloxanyl styrene, heptamethyl trisiloxanyl styrene, nonamethyl tetrasiloxanyl styrene, heptacosamethyl tridecasiloxanyl styrene, hentriaconta methyl pentadecasiloxanyl styrene, tris(pentamethyl disiloxy)silyl styrene, (tristrimethyl siloxy)siloxanyl bis(trimethyl siloxy) silyl styrene, bis(heptamethyl trisiloxy)methyl silyl styrene, heptakis(trimethyl siloxy)trisiloxanyl styrene, tris[tris(trimethyl siloxy)siloxy]silyl styrene, bis(tridecamethyl hexasiloxy)methylsilyl styrene, heptamethyl cyclotetrasiloxanyl styrene, heptamethyl cyclotetrasiloxy bis(trimethyl siloxy) silyl styrene, and tripropyl tetramethyl cyclotetrasiloxanyl styrene.

Besides them, polysiloxane macromonomers having carbon-carbon unsaturated bonds at one end (or both ends), and silicone-containing fumaric acid esters are used.

N-vinyl heterocyclic monomers are cyclic N-vinyl lactams. For example, they are N-vinyl-2-pyrrolidones, N-vinyl-2-piperidones, N-vinyl-3-piperidones, N-vinyl-4-piperidones, N-vinyl-2-caprolactams, and N-vinyl-oxazolidones.

N-vinyl-2-pyrrolidones are, for example, N-vinyl-2-pyrrolidone, N-vinyl-3-methyl-2-pyrrolidone, N-vinyl-4-methyl-2-pyrrolidone, N-vinyl-5-methyl-2-pyrrolidone, N-vinyl-3-ethyl-2-pyrrolidone, N-vinyl-4-ethyl-2-pyrrolidone, N-vinyl-5-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl-5-methyl-5-ethyl-2-pyrrolidone, and N-vinyl-3,4,5-trimethyl-3-ethyl-2-pyrrolidone.

N-vinyl-2-piperidones are, for example, N-vinyl-2-piperidone, N-vinyl-3-methyl-2-piperidone, N-vinyl-4-methyl-2-piperidone, N-vinyl-5-methyl-2-piperidone, N-vinyl-6-methyl-2-piperidone, N-vinyl-3-ethyl-2-piperidone, N-vinyl-4-ethyl-2-piperidone, N-vinyl-5-ethyl-2-piperidone, N-vinyl-6-ethyl-2-piperidone, N-vinyl-3,5-dimethyl-2-piperidone, and N-vinyl-4,4-dimethyl-2-piperidone.

N-vinyl-2-caprolactams are, for example, N-vinyl-2-caprolactam, N-vinyl-3-methyl-2-caprolactam, N-vinyl-4-methyl-2-caprolactam, N-vinyl-5-methyl-2-caprolactam, N-vinyl-6-methyl-2-caprolactam, N-vinyl-7-methyl-2-caprolactam, N-vinyl-3-ethyl-2-caprolactam, N-vinyl-4-ethyl-2-caprolactam, N-vinyl-5-ethyl-2-caprolactam, N-vinyl-6-ethyl-2-caprolactam, N-vinyl-7-ethyl-2-caprolactam, N-vinyl-3,5-dimethyl-2-caprolactam, N-vinyl-4,6-dimethyl-2-caprolactam, and N-vinyl-3,5,7-trimethyl-2-caprolactam.

N-vinyl-oxazolidones are, for example, N-vinyl-oxazolidone, N-vinyl-4-methyloxazolidone, N-vinyl-5-methyloxazolidone, N-vinyl-4-ethyloxazolidone, and N-vinyl-5-ethyloxazolidone.

Besides them, N-vinyl imidazolidone, N-vinyl succinimide, N-vinyl diglycolylimide, N-vinyl-3-morpholinone, and N-vinyl-5-methyl-3-morpholinone are also used.

As crosslinkable multifunctional monomers, multifunctional (meth)acrylic acid esters, multifunctional vinyl compounds, multifunctional allyl compounds, and N,N'-alkylene bis(meth)acrylamides can be listed.

Multifunctional (meth)acrylic acid esters are, for example, ethylene glycol di(meth)acrylate, diethylene glycol di(meth)acrylate, triethylene glycol di(meth)acrylate, tetraethylene glycol di(meth)acrylate, nonaethylene glycol di(meth)acrylate, tetradecaethylene glycol di(meth)acrylate, tricosaethylene glycol di(meth)acrylate, propylene glycol di(meth)acrylate, dipropylene glycol di(meth)acrylate, tripropylene glycol di(meth)acrylate, nonapropylene glycol di(meth)acrylate, trimethylene glycol di(meth)acrylate, glycerol di(meth)acrylate, 1,3-butanediol di(meth)acrylate, 1,4-butanediol di(meth)acrylate, neopentyl glycol di(meth)acrylate, 1,6-hexanediol di(meth)acrylate, glycerol tri(meth)acrylate, trimethylolpropane tri(meth)acrylate, and pentaerythritol tetra(meth)acrylate.

Multifunctional vinyl compounds are, for example, vinyl (meth)acrylate, divinyl benzene, and N,N'-divinyl bislactam.

Multifunctional allyl compounds are, for example, allyl (meth)acrylate, diallyl itaconate, monoallyl itaconate, diallyl succinate, diallyl adipinate, diallyl phthalate, diallyl isophthalate, diallyl terephthalate, triallyl cyanurate, triallyl isocyanurate, triallyl phosphate, and trimellitic acid triallyl.

N,N'-alkylene bis(meth)acrylamides are, for example, N,N'-methylene bis(meth)acrylamide, N,N'-ethylene bis(meth)acrylamide, and N,N'-dihydroxyethylene-bis(meth)acrylamide.

Besides them, for example, aryloxyethyl(meth)acrylate, diaryloxyethyl itaconate, monoaryloxyethyl itaconate, 3-butenoic acid (meth)acryloyloxyethyl ester, 2-butenoic acid (meth)acryloyloxyethyl ester, pentaerythritol tetra(3-butanate), pentaerythritol tetra(crotonate), 1,3,5-tri(3-butenoic acid)phenylester, 1,3,5-tri(2-butenoic acid)phenylester, tri(3-butenoyloxy ethyl)isocyanurate, tri(2-butenoyloxy ethyl)isocyanurate, [2-(1'-(meth)acryloyloxyethyl)-4-allyl]-N,N'-tolylene carbamate, 4-allyl-2-(N-(meth)acryloylamino triyl)-N'-carbamate, 2,4-diallyl-N,N'-tolylene biscarbamate, [2-allyl-4-(1'-(meth)acryloyloxyethyl)]-N,N'-tolylene carbamate, 2-allyl-4-(N-(meth)acryloylamino triyl)-N'-carbamate, and 2,4-(1',1"-di(meth)acryloyloxyethyl)-N,N'-tolylene biscarbamate are used.

Not only one kind but also two kinds or more of the foregoing compounds may be used.

Further, water-soluble polymers other than the foregoing cellulose derivatives may be used for the foregoing pasty mixture according to a necessity. From among, polyvinyl alcohols were preferably used.

At first, the water-soluble compound (C) is solved in water at the moment of carrying out the present invention. Next, the cellulose derivative (B) is added. At that moment, a care needs to be taken so that "unmixed-in lump of flour" is not produced. After adding the cellulose derivative, they are kneaded sufficiently. As a result, pasty samples are obtained. When the water-soluble compound is not selected as the compound (C), it is enough for the compound (C) to appropriately uniformly disperse into the pasty samples. That is, the gel obtained with the reaction by the ionizing radiation exposure is excellent in the transparency when the cellulose derivative (B) and the compound (C) appropriately uniformly disperse. Additionally, the obtained get was rich in the mechanical strength when the compound (C) was a compound (monomer) having a hydrophobic group.

α-ray, β-ray, γ-ray, electron beam, and X-ray are used as the radiation to which the pasty samples of the cellulose derivative (B) and the compound (C) are exposed. From a viewpoint of industrial production, the γ-ray coming from Co60, and the electron beam and the X-ray by an accelerator are preferably used. While a low-energy electron beam accelerator with 1 MeV or less can be also used, a middle-energy (or a high-energy) electron beam accelerator with 1 MeV or more is preferably used. Preferably the radiation dose of the ionizing radiation is 1 to 200 kGy. More preferably it is 5 to 100 kGy. When the exposure dose is too few, a degree of the crosslink is not enough. For this, the mechanical strength of the obtained contact lens is not enough. When the radiation dose is too much, a degree of the crosslink becomes excessive. And yet, the decomposition develops. For this reason, the obtained contact lens is fragile.

The water-soluble organic diluents may be used at the moment of preparing the foregoing pasty samples. As the water-soluble organic diluents, alcohol (for example, methanol, ethanol, propanol, 2-propanol, butanol, ethylene glycol, diethylene glycol, triethylene glycol, tetraethylene glycol, and polyethylene glycol, and glycerin), ketone, (acetone and methylethylketone), dimethylformamide, dimethylsulfoxide, N-methyl-2-pyrrolidone can be listed. An amount of the organic diluents is, for example, 0.1 to 10% by weight. Preferably 0.2 to 5% by weight. Using such organic diluents additionally improved dispersibility.

Additionally, ultraviolent light absorbers and colorants are used according to a necessity at the moment of carrying out the present invention. When theses agents are used, light with a specific wavelength is cut. Additionally, the foregoing agents could be of polymerizable type.

Hereinafter, the present invention will be explained by listing specific exemplary examples. However, the present invention is not limited to the exemplary examples.

Additionally, viscosity of a 2% aqueous solution (20° C.) of hydroxypropyl cellulose (made by Wako Pure chemical Industries, Ltd.) by weight in the exemplary example described below was 1,000 to 5,000 mPa·s. The viscosity of a 2% aqueous solution (20° C.) of methyl cellulose (made by Shin-Etsu Chemical Co., Ltd.) by weight in the exemplary example described below was 4,000 mPa·s. The viscosity of a 2% aqueous solution (20° C.) of hydroxypropyl methyl cellulose (made by Shin-Etsu Chemical Co., Ltd.) by weight in the exemplary example described below was 4,000 mPa·s. The viscosity of a 4% aqueous solution (20° C.) of polyvinyl alcohol (made by KURARAY CO., LTD.) by weight in the exemplary example described below was 40 to 48 mPa·s. A degree of saponification of the foregoing polyvinyl alcohol was 87 to 89%, and a degree of polymerization thereof was 2,400.

EXEMPLARY EXAMPLE 1

Tricosaethylene glycol dimethacrylate (23 GDMA) of 0.2 g was added to water of 79.8 g and they were sufficiently stirred. Next, powdery hydroxypropyl cellulose (HPC) of 20 g was added. In particular, it was added so that "unmixed-in lump of flour" was not produced. They were mixed sufficiently, and the pasty samples were obtained. The contact lens forming die was filled with this pasty samples. They were degassed. Thereafter, they were exposed to the ionizing radiation (radiation dose of 10 kGy). This allowed the polymerization reaction and the crosslinking reaction to develop. The obtained gel was immersed into a large quantity of water for 24 hours. In addition, it was immersed into a physiological saline solution for several hours. The obtained contact lens was a highly hydrous soft contact lens rich in the flexibility. Other features are shown in Table-1.

EXEMPLARY EXAMPLE 2

Ethylene glycol dimethacrylate (EDMA) of 0.03 g was added to water of 77.97 g and they were sufficiently stirred. In addition, 2-hydroxyethyl methacrylate (2-HEMA) of 2 g was added, and they were stirred sufficiently. Next, powdery HPC of 20 g was added. They were mixed sufficiently, and the pasty samples were obtained. Thereafter, the process was performed in accordance with the exemplary example 1. However, the radiation dose is 50 kGy. The obtained contact lens was a highly hydrous soft contact lens rich in the flexibility. Other features are shown in Table-1.

EXEMPLARY EXAMPLE 3

23 GDMA of 0.2 g was added to water of 77.8 g and they were sufficiently stirred. In addition, 2-HEMA of 2 g was added, and they were stirred sufficiently. Next, powdery HPC of 20 g was added. They were mixed sufficiently, and the pasty samples were obtained. Thereafter, the process was performed in accordance with the exemplary example 1. However, the radiation dose is 50 kGy. The obtained contact lens was a highly hydrous soft contact lens rich in the flexibility. Other features are shown in Table-1.

EXEMPLARY EXAMPLE 4

2-HEMA of 1 g was added to water of 77 g and they were sufficiently stirred. In addition, methylmethacrylate (MMA) of 2 g was added, and they were mixed sufficiently. Next, powdery HPC of 20 g was added. They were stirred sufficiently, and the pasty samples were obtained. Thereafter, the process was performed in accordance with the exemplary example 1. However, the radiation dose is 20 kGy. The obtained contact lens was a highly hydrous soft contact lens rich in the flexibility. Other features are shown in Table-1.

EXEMPLARY EXAMPLE 5

23 GDMA of 0.2 g was added to water of 76.8 g and they were sufficiently stirred. In addition, 2-ethoxyethyl methacrylate (EEMA) of 2 g and MMA of 1 g were added, and they were stirred sufficiently. Next, powdery HPC of 20 g was added. They were mixed sufficiently, and the pasty samples were obtained. Thereafter, the process was performed in accordance with the exemplary example 1. However, the radiation dose is 20 kGy. The obtained contact lens was a highly hydrous soft contact lens rich in the flexibility. Other features are shown in Table-1.

EXEMPLARY EXAMPLE 6

23 GDMA of 0.2 g was added to water of 76.8 g and they were sufficiently stirred. In addition, 2-methoxyethyl methacrylate of 2 g and EEMA of 1 g were added, and they were stirred sufficiently. Next, powdery HPC of 20 g was added. They were mixed sufficiently, and the pasty samples were obtained. Thereafter, the process was performed in accordance with the exemplary example 1. However, the radiation dose is 20 kGy. The obtained contact lens was a highly hydrous soft contact lens rich in the flexibility. Other features are shown in Table-1.

EXEMPLARY EXAMPLE 7

23 GDMA of 0.2 g was added to water of 76.8 g and they were sufficiently stirred. In addition, triethylene glycol monomethylether monomethacrylate of 1 g and EEMA of 2 g were added, and they were stirred sufficiently. Next, powdery HPC of 20 g was added. They were mixed sufficiently, and the pasty samples were obtained. Thereafter, the process was performed in accordance with the exemplary example 1. However, the radiation dose is 20 kGy. The obtained contact lens was a highly hydrous soft contact lens rich in the flexibility. Other features are shown in Table-1.

EXEMPLARY EXAMPLE 8

Tetraethylene glycol dimethacrylate (4 GDMA) of 0.2 g was added to an ethanol aqueous solution (2% by weight) of 78.5 g and they were sufficiently stirred. A mixture of polydimethyl siloxane containing a methacryl group at a single terminal of 1 g (molecular weight: approximate 1,000) and MMA of 0.3 g was added to the foregoing mixed aqueous solution, and they were stirred sufficiently. Next, powdery HPC of 20 g was added. They were mixed sufficiently, and the pasty samples were obtained. Thereafter, the process was performed in accordance with the exemplary example 1. However, the radiation dose is 50 kGy. The water-immersion time of the obtained gel is 48 hours. The obtained contact lens was a highly hydrous soft contact lens rich in the flexibility. Other features are shown in Table-1.

EXEMPLARY EXAMPLE 9

A mixture of polydimethyl siloxane containing methacryl groups at both terminals of 1 g (molecular weight: approximate 1,000) and MMA of 0.5 g was added to an ethanol aqueous solution (2% by weight) of 78.5 g and they were sufficiently stirred. Next, powdery HPC of 20 g was added. They were mixed sufficiently, and the pasty samples were obtained. Thereafter, the process was performed in accordance with the exemplary example 1. However, the radiation dose is 50 kGy. The water-immersion time of the obtained gel is 48 hours. The obtained contact lens was a highly hydrous soft contact lens rich in the flexibility. Other features are shown in Table-1.

EXEMPLARY EXAMPLE 10

23 GDMA of 0.2 g was added to water of 57.8 g and they were sufficiently stirred. In addition, a polyvinyl alcohol aqueous solution of 20 g (5% by weight) was added and they were sufficiently stirred. Further, MMA of 2 g was added, and they were stirred sufficiently. Next, powdery HPC of 20 g was added. They were mixed sufficiently, and the pasty samples were obtained. Thereafter, the process was performed in accordance with the exemplary example 1. However, the radiation dose is 20 kGy. The obtained contact lens was a highly hydrous soft contact lens rich in the flexibility. Other features are shown in Table-1.

EXEMPLARY EXAMPLE 11

23 GDMA of 0.2 g was added to water of 79.8 g and they were sufficiently stirred. Next, powdery HPC of 15 g and methyl cellulose of 5 g were added. They were mixed sufficiently, and the pasty samples were obtained. Thereafter, the process was performed in accordance with the exemplary example 1. However, the radiation dose is 30 kGy. The obtained contact lens was a highly hydrous soft contact lens rich in the flexibility. Other features are shown in Table-1.

EXEMPLARY EXAMPLE 12

23 GDMA of 0.2 g was added to water of 79.8 g and they were sufficiently stirred. Next, powdery HPC of 15 g and hydroxypropyl methyl cellulose of 5 g were added. They were mixed sufficiently and the pasty samples were obtained. Thereafter, the process was performed in accordance with the exemplary example 1. However, the radiation dose is 30 kGy. The obtained contact lens was a highly hydrous soft contact lens rich in the flexibility. Other features are shown in Table-1.

COMPARATIVE EXEMPLARY EXAMPLE 1

Powdery HPC of 20 g was added to water of 80 g. They were sufficiently mixed, and the pasty samples were obtained. Thereafter, the process was performed in accordance with the exemplary example 1. However, the radiation dose is 50 kGy. The obtained contact lens was fragile. Other features are shown in Table-1. This comparative exemplary example is an example in which the compound (C) of the present invention was not used.

COMPARATIVE EXEMPLARY EXAMPLE 2

Powdery HPC of 66 g, N,N-dimethylacrylamide (DMAA) of 33 g, and EDMA of 1 g were mixed sufficiently. In particular, HPC and DMAA are in a status of being miscible with each other. In addition, benzoyl peroxide (BPO: polymerization initiator) of 0.2 g was added. After they were sufficiently mixed, the contact lens forming die was filled with this mixture. It was kept for ten minutes at 130° C., and the polymerization reaction was performed. The obtained gel was immersed into a large quantity of water for 24 hours. In addition, it was immersed into a physiological saline solution for several hours. The obtained contact lens was fragile. Other features are shown in Table-1. The contact lens of this comparative exemplary example is equivalent to the contact lens of the Patent literature 1.

COMPARATIVE EXEMPLARY EXAMPLE 3

Powdery HPC of 50 g, DMAA of 40 g, MMA of 9 g, EDMA of 1 g were mixed sufficiently. In particular, HPC and DMAA are in a status of being miscible with each other. In addition, BPO of 0.3 g was added. Thereafter, the process was performed in accordance with the comparative exemplary example 2. The obtained contact lens was fragile. Other features are shown in Table-1. The contact lens of this comparative exemplary example is equivalent to the contact lens of the Patent literature 1.

FEATURES

The features of the soft contact lens of each of the above-mentioned examples are shown in Table-1.

TABLE 1

| | Breaking strength (Kg/cm$^2$) | Breaking elongation (%) | Water content ratio (%) | Transparency | Oxygen permeability coefficient | Gel fraction (%) | Wearing feeling | Shape retainability |
|---|---|---|---|---|---|---|---|---|
| Example 1 | 2 | 174 | 93 | Transparent | 74 | 87 | ◎ | ◎ |
| Example 2 | 2 | 166 | 87 | Transparent | 70 | 82 | ◎ | ◎ |
| Example 3 | 2 | 176 | 87 | Transparent | 70 | 82 | ◎ | ◎ |
| Example 4 | 3 | 180 | 92 | Transparent | 72 | 81 | ◎ | ◎ |
| Example 5 | 6 | 203 | 89 | Transparent | 72 | 83 | ◎ | ◎ |
| Example 6 | 5 | 215 | 92 | Transparent | 74 | 87 | ◎ | ◎ |
| Example 7 | 4 | 185 | 92 | Transparent | 74 | 90 | ◎ | ◎ |
| Example 8 | 8 | 230 | 87 | Almost transparent | 113 | 80 | ◎ | ◎ |
| Example 9 | 10 | 221 | 86 | Almost transparent | 135 | 81 | ◎ | ◎ |
| Example 10 | 7 | 182 | 91 | Transparent | 74 | 90 | ◎ | ○ |
| Example 11 | 2 | 170 | 91 | Almost transparent | 74 | 80 | ◎ | ○ |
| Example 12 | 2 | 167 | 90 | Almost transparent | 72 | 87 | ◎ | ○ |
| Comparative example 1 | 1 | 98 | 91 | Transparent | 74 | 86 | ◎ | X |
| Comparative example 2 | 1 | 60 | 87 | Almost transparent | 68 | 33 | ○ | X |
| Comparative example 3 | 3 | 95 | 80 | Almost transparent | 57 | 40 | Δ | X |
| Comparative example 4 | 3 | 175 | 57 | Transparent | 28 | — | ◎ | Δ |
| Comparative example 5 | 11 | 180 | 30 | Slightly opacified | 100 | — | Δ | ○ |

Oxygen permeability coefficient: unit is (cm$^2$/sec) · (mLO$_2$/mL · mmHg).
Gel fraction: the obtained gel was frozen and dried until it reached to a constant weight.

This dry sample was weighed (initial dry weight). It was put into a 200-mesh stainless net, and was immersed into a large amount of water for 24 hours. The un-crosslinked component shifts to a water side. Only the not-dissolved component was left in the grid. After the not-dissolved component was dried in vacuum, it was weighed. The gel fraction was calculated according to the equation described below. A high gel fraction indicates that the leachable substances are few. Thus, it is preferable that the gel fraction is high.

Gel fraction (%)=(weight of not-dissolved component/initial dry weight)×100

Wearing feeling: 10 panelists wore the contact lenses. The evaluation was made based upon subjective symptom of the panelists (foreign-body sensation, and discomfort for cloudiness caused by wetting failure). A ◎ mark indicates that the number of the panelists having the subjective symptom is one or less, a ○ mark indicates that the number is two or three, a Δ mark indicates that the number is four or five and a X mark indicates that the number is six or more.

Shape retainability: 10 panelists evaluated the contact lenses with regard to easiness of handling prior to wearing the contact lens (the contact lens retaining the lens shape is easy of the handling). A ◎ mark indicates that the number of the panelists saying that the handling is difficult is one or less, a ○ mark indicates that the number is two or three, a Δ mark indicates that the number is four or five and a X mark indicates that the number is six or more.

The contact lens of the comparative exemplary example 4 is a commercially-available daily disposable soft contact lens.

The contact lens of the comparative exemplary example 5 is a commercially-available silicone-hydrogel contact lens.

As can be seen from Table-1, the contact lenses of the above-mentioned exemplary examples have the following features. They are highly hydrous soft contact lens. They have a high gel fraction. Thus, the leachable substances are few. This means that the safety thereof is high. They are excellent in the oxygen permeability because they are highly hydrous (the water content rate of 85% or more). They are excellent in the water wettabilitry and are excellent in the wearing feeling. They are excellent in the shape retainability even though they are highly hydrous. They have the sufficient strength that does not practically cause trouble. They are excellent in the transparency.

On the other hand, the contact lens of the comparative exemplary example 1 using only the cellulose derivative has a small breaking elongation. Yet, the breaking strength thereof is small. Yet, the shape retainability is poor.

The contact lenses of the comparative exemplary examples 2 and 3, which are equivalent to the Patent Literature 1, have a small breaking elongation, and yet are also poor in the shape retainability.

The invention claimed is:

1. A manufacturing method of a contact lens, comprising:
   exposing to radiation, a pasty mixture comprising:
   a cellulose derivative,
   a polymerizable compound capable of coupling to the cellulose derivative, and
   water, to obtain the contact lens;
   wherein
   a water content ratio of the contact lens is 85 to 95%,
   a breaking elongation of the contact lens is 150 to 270%, and
   a breaking strength of the contact lens is from 2 to 15 Kg/cm$^2$.

2. The manufacturing method of a contact lens according to claim 1, further comprising:
   filling a contact lens forming die with the pasty mixture; and exposing the pasty mixture in the forming die to the radiation.

3. The manufacturing method of a contact lens according to claim 1, wherein the radiation exposure results in the occurrence of at least one reaction selected from the group consisting of a coupling reaction in which the polymerizable compound couples to the cellulose derivatives, a polymerizing reaction in which the polymerizable compound polymerizes, and a crosslinking reaction which directly crosslinks the cellulose derivative.

4. The manufacturing method of a contact lens according to claim 1, wherein the water comprises at least one of an electrolytic substance and a water-soluble organic diluent.

5. The manufacturing method of a contact lens according to claim 1, wherein
a ratio of the polymerizable compound is 1 to 17.6 parts by mass per 100 parts by mass of the cellulose derivative, and
a ratio of the water is 50 to 1900 parts by mass per 100 parts by mass of the cellulose derivative.

6. The manufacturing method of a contact lens according to claim 1, wherein the cellulose derivative is at least one selected from the group consisting of a carboxyalkyl cellulose, a hydroxyalkyl cellulose, and an alkyl cellulose.

7. The manufacturing method of a contact lens according to claim 1, wherein the polymerizable compound is a monomer having carbon-carbon unsaturated bonds.

8. The manufacturing method of a contact lens according to claim 1, wherein the radiation is selected from the group consisting of γ-ray, X-ray, and electron beam, and an exposure dose of the radiation is from 1 to 200 kGy.

9. A contact lens, obtained by the method according to claim 1;
wherein
a water content ratio of the contact lens is 85 to 95%,
a breaking elongation of the contact lens is 150 to 270%, and
a breaking strength of the contact lens is from 2 to 15 Kg/cm$^2$.

10. A contact lens, comprising a crosslinked cellulose derivative, the structure of the crosslinked cellulose derivative comprising:
self-crosslinking the cellulose derivative, and
crosslinking via polymers of polymerizable compound capable of coupling to the cellulose derivative
wherein
a water content ratio of the contact lens is 85 to 95%,
a breaking elongation of the contact lens is 150 to 270%, and
a breaking strength of the contact lens is from 2 to 15 Kg/cm$^2$.

11. The contact lens according to claim 10, wherein a ratio of the polymerizable compound to the cellulose derivative in the crosslinked structure is from 1 to 17.6 parts by mass per 100 parts by mass of the cellulose derivative.

12. The contact lens according to claim 10, wherein the cellulose derivative is at least one selected from the group consisting of a carboxyalkyl cellulose, a hydroxyalkyl cellulose, and an alkyl cellulose.

13. The contact lens according to claim 10, wherein the polymerizable compound is a monomer having carbon-carbon unsaturated bonds.

14. The contact lens according to claim 10, wherein
the cellulose derivative comprises hydroxypropylcellulose; and
the polymerizable compound comprises tricosaethylene glycol dimethacrylate.

15. The contact lens according to claim 10, wherein
the cellulose derivative comprises hydroxypropylcellulose; and
the polymerizable compound comprises ethylene glycol dimethacrylate and 2-hydroxyethyl methacrylate.

16. The contact lens according to claim 10, wherein
the cellulose derivative comprises hydroxypropylcellulose; and
the polymerizable compound comprises tricosaethylene glycol dimethacrylate and 2-hydroxyethyl methacrylate.

17. The contact lens according to claim 10, wherein
the cellulose derivative comprises hydroxypropylcellulose; and
the polymerizable compound comprises methylmethacrylate and 2-hydroxyethyl methacrylate.

18. The contact lens according to claim 10, wherein
the cellulose derivative comprises hydroxypropylcellulose; and
the polymerizable compound comprises tricosaethylene glycol dimethacrylate, 2-ethoxyethyl methacrylate and methyl methacrylate.

19. The contact lens according to claim 10, wherein
the cellulose derivative comprises hydroxypropylcellulose; and
the polymerizable compound comprises tricosaethylene glycol dimethacrylate, 2-methoxyethyl methacrylate and 2-ethoxyethyl methacrylate.

20. The contact lens according to claim 10, wherein
the cellulose derivative comprises hydroxypropylcellulose; and
the polymerizable compound comprises tricosaethylene glycol dimethacrylate, triethylene glycol monomethylether monomethacrylate and 2-ethoxyethyl methacrylate.

* * * * *